R. A. B. WALSH.
METHOD OF AND MACHINE FOR MAKING WIRE GLASS.
APPLICATION FILED DEC. 2, 1907.
940,842.
Patented Nov. 23, 1909.
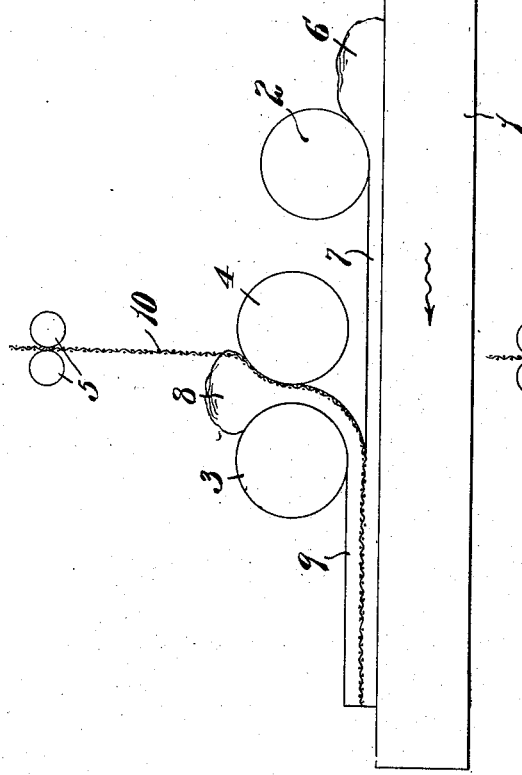
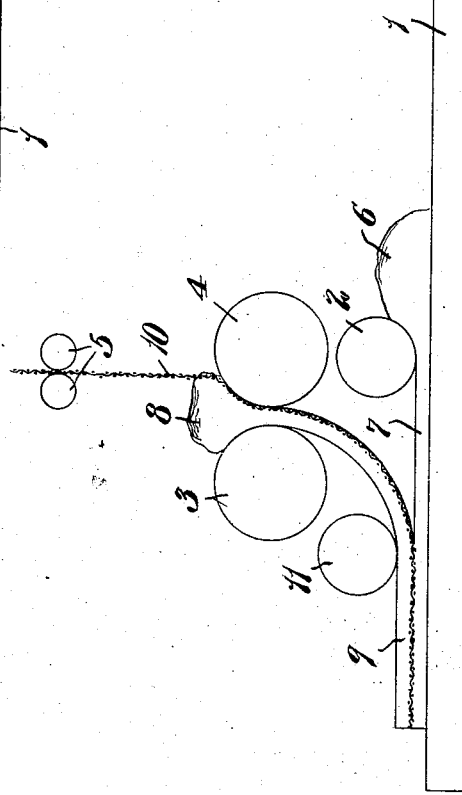
Witnesses:
Geo. R. Ladron
Nells L. Church
Inventor:
Robert A. B. Walsh.
By Bakewell & Cornwall Attys.

UNITED STATES PATENT OFFICE.

ROBERT A. B. WALSH, OF ST. LOUIS, MISSOURI, ASSIGNOR TO MISSISSIPPI GLASS COMPANY, OF ST. LOUIS, MISSOURI, A CORPORATION OF MISSOURI.

METHOD OF AND MACHINE FOR MAKING WIRE-GLASS.

940,842. Specification of Letters Patent. Patented Nov. 23, 1909.

Original application filed May 22, 1907, Serial No. 375,112. Divided and this application filed December 2, 1907. Serial No. 404,850.

*To all whom it may concern:*

Be it known that I, ROBERT A. B. WALSH, a citizen of the United States, residing at St. Louis, Missouri, have invented a certain new and useful Improvement in Methods of and Machines for Making Wire-Glass, of which the following is a full, clear, and exact description, such as will enable others skilled in the art to which it appertains to make and use the same, reference being had to the accompanying drawings, forming part of this specification, in which—

Figures 1 and 2 are side elevations of different forms of apparatus which may be used in practicing my invention.

This invention relates to a new and useful method of, and a machine for making wire glass, and particularly wire glass in which a plurality of layers are employed to form the ultimate sheet.

The object of my invention is to produce a sheet of wire glass having smooth brilliant surfaces, the wire of said sheet retaining its original bright and new appearance after it has been embedded in the glass.

In the manufacture of wire glass, the tendency of the wire is to contract and "draw" the glass so as to produce an uneven or an irregular surface. It has been proposed, see for illustration the patent to Walsh, No. 610,593, dated September 13, 1898, to cure these irregularities by smoothing them down by a finishing roller; but this cannot always be successfully accomplished, because, while the finishing roller acts upon the elevations, it will not perfectly transfer the surplus glass to the depressions and make a perfect weld. It has also been proposed, see for illustration the Schmertz reissue patent No. 12,443, dated January 30, 1906, to press the wire mesh into the top surface of a first formed sheet or layer of glass and then spread a finishing layer or sheet of molten glass thereover. This method produces a better and smoother finish to the top surface of the sheet than the Walsh method first-mentioned. In both of these methods, the wire, on account of its exposure to atmosphere after being heated, loses its bright and new appearance and looks black in the finished sheet. In the Schmertz method the weld between the two layers occurs principally in the plane of the wire, and as the wire is at places left free to "draw" this action is sometimes observed on the surface of the second layer.

Briefly stated, my present method consists in forming a bottom layer or sheet of glass, forming a top layer or sheet of glass and drawing a wire mesh into the underneath surface of said top layer and thereafter combining the layers together to form a single sheet. Preferably, the wire mesh is caused to cut its way into the underneath surface of the top layer or sheet at the same time said sheet is being formed so that in its heated condition the wire mesh will not be exposed to atmosphere and will accordingly preserve its bright and new appearance in the finished product.

It is obvious that various forms of apparatus could be used for practicing my invention and I have herein illustrated two forms of apparatus for carrying out my method, that which is illustrated in Fig. 1 comprising a table 1 having a smooth surface roller 2 arranged above the upper surface thereof for forming a mass of molten glass into a bottom layer or sheet and a pair of rollers 3 and 4 arranged above the table for forming a separate mass of molten glass into a top layer or sheet, the roller 3 also operating to combine the two layers together to form a single sheet. Said apparatus also comprises a pair of tension rolls 5 which are so disposed relatively to the rollers 3 and 4 that a wire mesh will cut its way into the mass of molten glass which is formed into the top layer or sheet. In practicing my method with apparatus of this description, a mass of molten glass 6 is dumped onto the table adjacent the roller 2 and the table is then moved in the direction of the arrow, thereby causing the roller 2 to form the mass of molten glass 6 into a bottom layer or sheet 7. When the front end of said bottom layer 7 reaches the rollers 3 and 4 a second mass of molten glass 8 is dumped between the rollers 3 and 4 which forms said mass into a top layer or sheet 9 that moves downwardly onto the bottom layer and is combined therewith by the roller 3. Prior to the operation of pouring the mass of molten glass 8 between the rollers 3 and 4 the wire mesh 10 which passes between the tension rolls 5 was placed upon the roller 4 so that as the mass 7 is being formed into a top layer the wire mesh embeds itself or cuts its way into said mass and is thus completely covered before it has a chance to become oxidized by the atmosphere. Although I have previously stated that the table is moved longitudinally, it will, of course, be understood that the table could be stationary and the rollers and tension rolls be moved longitudinally thereof without departing from the spirit of my invention.

In Fig. 2 I have shown another form of apparatus which could be used for practicing my method, this apparatus being substantially the same as that shown in Fig. 1 except that an independent roller 11 is used for combining the two layers together, the roller 3 simply coöperating with the roller 4 to form a mass of molten glass 8 into a top layer. It will be observed that a complete sheet of wire glass is first formed; to-wit, a sheet or layer of wire glass, into the underneath surface of which a wire mesh is drawn, and finally, a finishing layer of glass is welded to the underneath surface of the layer in which the wire mesh is embedded, the finishing layer filling in the spaces in the top layer which were caused by the wire as it embedded itself in said layer. Thus, the tendency of the wire to "draw" the glass in contracting and produce an irregular and uneven surface on the sheet or layer in which it is embedded, is corrected by the finishing layer which not only fills in the unevenness in the layer that contains the wire mesh but said finishing layer more readily partakes of and retains the smooth even surface imparted thereto by the table.

This case is a division of an application filed by me May 22, 1907, and serially numbered 375,112.

Having thus described my invention, what I claim as new and desire to secure by Letters Patent is:

1. An apparatus for making wire glass, comprising means for forming a sheet or layer of glass, means for forming a second sheet or layer of glass, means for drawing a wire mesh into the underneath surface of said last-named sheet or layer, and means for combining said layers together; substantially as described.

2. An apparatus of the character described, comprising means for forming a sheet or layer of glass, tension devices for drawing the wire mesh into the underneath surface of said sheet, and means for forming a second sheet or layer of glass and welding it to the uneven underneath surface of the layer in which the wire mesh is embedded; substantially as described.

3. An apparatus for making wire glass, comprising means for forming a sheet or layer of glass, means for drawing a wire mesh into the underneath surface of said sheet simultaneously with the operation of forming it, means for forming a second sheet or layer of glass and welding it to the uneven underneath surface of the sheet in which the wire mesh is embedded; substantially as described.

4. An apparatus for making wire glass, comprising a table, a roller arranged above said table for spreading a mass of molten glass thereover to form a bottom layer or sheet, a pair of rollers arranged above the table for forming a second mass of molten glass into a top layer, and tension rolls so disposed relatively to said pair of rollers that a wire mesh is drawn into the underneath surface of the top layer at the same time said layer is being formed; substantially as described.

5. An apparatus of the character described, comprising means for rolling a mass of molten glass into a bottom layer or sheet, means for rolling a separate mass of molten glass into a top layer or sheet, tension devices for drawing a wire mesh into the underneath surface of said top layer so that it is completely embedded, and independent means for combining said layers together; substantially as described.

6. The method of making wire glass, which consists of forming a bottom layer or sheet of glass, forming a top layer or sheet of glass and drawing the wire mesh into the underneath surface of said top layer, and thereafter combining said layers together; substantially as described.

7. The method of making wire glass, which consists in first forming a bottom layer or sheet of glass, thereafter forming a top layer or sheet of glass and simultaneously drawing the wire mesh into the underneath surface of said top layer so that it is completely embedded, and thereafter welding said top layer to the upper surface of the bottom layer; substantially as described.

8. The method of making wire glass, which consists in progressively forming masses of molten glass into independent layers or sheets and simultaneously exerting tension on a wire mesh so that it will cut its way into the underneath face of the top layer, and thereafter combining said layers together to form a single sheet of wire glass; substantially as described.

9. The method of making wired glass which consists in rolling a mass of molten glass into layer form, rolling a separate mass of molten glass into layer form and simultaneously pulling a wire mesh beneath the bottom surface thereof so that it is completely covered, and thereafter combining said layers into a single sheet, substantially as described.

10. The method of making wired glass which consists in rolling a mass of molten glass into layer form, rolling a separate mass of molten glass into layer form, and simultaneously pulling a wire mesh beneath the bottom surface thereof so that it is completely covered, and thereafter combining said layers into a single sheet; substantially as described.

In testimony whereof I hereunto affix my signature in the presence of two witnesses, this twenty-sixth day of November 1907.

ROBERT A. B. WALSH.

Witnesses:
F. R. CORNWALL,
GEORGE BAKEWELL.